(12) United States Patent
Thangarajah et al.

(10) Patent No.: US 12,468,637 B2
(45) Date of Patent: Nov. 11, 2025

(54) METHOD AND APPARATUS FOR PROVIDING ARTIFICIAL INTELLIGENCE MODEL SWAPPING TO SUPPORT FOUNDATION MODELS

(71) Applicant: HUAWEI TECHNOLOGIES CO., LTD., Shenzhen (CN)

(72) Inventors: Kishanthan Thangarajah, Kanata (CA); Shi Chang, Kanata (CA); Haoxiang Zhang, Kanata (CA); Boyuan Chen, Kanata (CA); Ahmed E. Hassan, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/428,056

(22) Filed: Jan. 31, 2024

(65) Prior Publication Data

US 2025/0245171 A1    Jul. 31, 2025

(51) Int. Cl.
*G06F 12/123* (2016.01)
(52) U.S. Cl.
CPC .................. *G06F 12/123* (2013.01)
(58) Field of Classification Search
CPC ...... G06F 12/123; G06F 12/12; G06F 12/127; G06F 12/128; G06F 12/0868; G06F 12/0893; G06F 12/0892
See application file for complete search history.

(56) References Cited

U.S. PATENT DOCUMENTS

| 11,138,125 B2 * | 10/2021 | Lu | G06F 12/0891 |
| 2016/0188490 A1 * | 6/2016 | Samih | G11C 7/1072 |
| | | | 711/135 |
| 2019/0354489 A1 * | 11/2019 | Gupta | G06F 12/128 |
| 2020/0175387 A1 * | 6/2020 | Braz | G06N 5/022 |
| 2020/0192811 A1 * | 6/2020 | Harnik | G06N 20/00 |
| 2021/0286730 A1 * | 9/2021 | Lv | G06F 12/127 |
| 2022/0215008 A1 * | 7/2022 | Adibowo | G06F 12/0802 |
| 2023/0342300 A1 * | 10/2023 | Liu | H04L 67/5682 |
| 2024/0111666 A1 * | 4/2024 | Wang | G06F 12/0246 |

(Continued)

FOREIGN PATENT DOCUMENTS

WO    WO-2022148306 A1 *    7/2022    ......... G06F 12/0891

OTHER PUBLICATIONS

WO-2022148306 English Language Translation.*

(Continued)

*Primary Examiner* — Tracy A Warren

(57) ABSTRACT

There is provided a method and apparatus for model selection for swapping between a first memory and a second memory. The method includes sorting models in a first list, the first list including models loaded in the first memory, wherein sorting is based at least in part on a least recently used (LRU) of each model. The method further includes removing duplicate models from a second list of models, the second list including models to be loaded into the first memory. The method further includes determining an eviction score of each of the models and selecting a model from the first list having a highest eviction score compared with other models in the first list. The method additionally includes swapping the selected model from the first memory to the second memory.

16 Claims, 5 Drawing Sheets

(56) References Cited

U.S. PATENT DOCUMENTS

2024/0202552 A1\* 6/2024 Srivatsa .................. G06N 20/00
2024/0211177 A1\* 6/2024 Seo ....................... G06F 3/0665

OTHER PUBLICATIONS

Peng, Yaqiong, and Haocheng Peng. "InferFair: Towards QoS-aware scheduling for performance isolation guarantee in heterogeneous model serving systems." Future Generation Computer Systems 150 (2024): 10-20.\*

Wu, Bingyang, Yinmin Zhong, Zili Zhang, Shengyu Liu, Fangyue Liu, Yuanhang Sun, Gang Huang, Xuanzhe Liu, and Xin Jin. "Fast distributed inference serving for large language models." arXiv preprint arXiv:2305.05920 (2023).\*

Kurniawan, Fandi Setio, Leanna Vidya Yovita, and Tody Ariefianto Wibowo. "Modified-LRU algorithm for caching on named data network." In 2019 International Conference on Electrical Engineering and Informatics (ICEEI), pp. 438-443. IEEE, 2019.\*

Kavar, C. C., and S. S. Parmar. "Improve the performance of LRU page replacement algorithm using augmentation of data structure." In 2013 Fourth International Conference on Computing, Communications and Networking Technologies (ICCCNT), pp. 1-5. IEEE, 2013.\*

Ghasemzadeh, Hassan, Sepideh Mazrouee, and Mohammad Reza Kakoee. "Modified pseudo LRU replacement algorithm." In 13th Annual IEEE International Symposium and Workshop on Engineering of Computer-Based Systems (ECBS'06), pp. 6-pp. IEEE, 2006.\*

Alghazo, Jaafar, Adil Akaaboune, and Nazeih Botros. "SF-LRU cache replacement algorithm." In Records of the 2004 International Workshop on Memory Technology, Design and Testing, 2004., pp. 19-24. IEEE, 2004.\*

Gujarati, A., et al., "Serving {DNNs} like Clockwork: Performance Predictability from the Bottom up", 14th USENIX Symposium on Operating Systems Design and Implementation, pp. 443-462, Nov. 4-6, 2020.

Yu, M., et al., "FaaSwap: SLO-Aware, GPU-Efficient Serverless Inference via Model Swapping", Feb. 8, 2024.

Webpage entitled "ModelMesh and KServe bring eXtreme scale standardized model inferencing on Kubernetes", Animesh Singh et al., Oct. 13, 2021, retrieved from Internet: https://developer.ibm.com/blogs/kserve-and-watson-modelmesh-extreme-scale-model-inferencing-for-trusted-ai/.

Webpage entitled "Model Multiplexing", retrieved from Internet: https://docs.ray.io/en/releases-2.24.0/serve/model-multiplexing.html on Jun. 13, 2024.

Sheng, Y., et al., "High-Throughput Generative Inference of Large Language Models with a Single GPU", Jun. 12, 2023.

Webpage entitled "The State of Serverless GPUs", Aishwarya Goel & Nilesh Agarwal, Apr. 10, 2023, retrieved from Internet: https://www.inferless.com/serverless-gpu-market.

"Serverless Architecture Market Size—By Service Type (Function as a Service (FaaS), Backend as a Service (BaaS)), By Deployment Mode (Public Cloud, Private Cloud, Hybrid Cloud), By Organization Size, By Component, By Industry Vertical & Forecast, 2024-2032", Aug. 2024, retrieved from Internet: https://www.gminsights.com/industry-analysis/serverless-architecture-market.

\* cited by examiner

METHOD AND APPARATUS FOR PROVIDING ARTIFICIAL INTELLIGENCE MODEL SWAPPING TO SUPPORT FOUNDATION MODELS

CROSS-REFERENCE TO RELATED APPLICATIONS

This is the first application filed for the present invention.

FIELD

The present disclosure pertains to memory allocation and in particular to a method and apparatus for providing artificial intelligence (AI) model swapping to support foundation models.

BACKGROUND

As is known, graphic processing units (GPUs) are expensive in terms of both cost and operation. When compared to a computer processing unit (CPU), the use of GPUs is more expensive for cloud providers and thus it is desired that their use be shared efficiently.

An AI workflow is a combination of multiple individual steps (or tasks) for execution and these individual steps can result in multiple inference calls to different AI models within each step. It would be understood that all of the AI models are not needed all the time. Requests are dynamic and thus AI model use can be dynamic. As such at a given time, not all of the AI models need to be loaded to the GPU as some AI models will be used less frequently than other AI models. Hosting unused AI models all the time can be considered to be a waste in terms of both cost as well as memory consumption.

As such, swapping of AI models is required with memory resource and cost constraints. GPU memory is both expensive and limited in size. When multiple AI models are required for execution, they often exceed to total available GPU memory. So, to handle different AI models, swapping-out AI models that are not needed and swapping-in AI models that are needed for execution is performed. There are several swapping techniques that are in the prior art, for example Clockwork, FaaSwap, ModelMesh and Ray Serve Multiplex.

Clockwork is a distributed model serving system. Clockwork uses a least recently used (LRU) method in order to determine which AI model should be loaded onto which GPUs based on how busy each GPU is and how long each AI model is expected to take to run and allocates models to the GPUs accordingly.

FaaSwap is a serverless AI model swapping platform to support fast inference. FaaSwap selects the least recently used (LRU) AI model and swaps that model out to host memory to make room for a new AI model. FaaSwap combines LRU with model priorities, by keeping two priority lists (high and low) and evicts low priority models that have almost no impact on performance when swapping while caching high priority AI models in GPU.

ModelMesh is a general-purpose AI model serving management/routing layer for kubernetes. ModelMesh uses a distributed LRU cache to store and serve runtime models. The cache management is performed by managing pods as a distributed least recently used (LRU) cache. Copies of AI models are loaded and unloaded based on usage recency and current request load.

Ray Serve Multiplex uses a simple LRU strategy to load and unload AI models from disk/storage to the GPU cache. Ray Serve Multiplex defines a maximum limit on how many AI models a serve instance can handle and starts evicting models when it reaches this limit.

However, none of the prior art have been applied to foundation model (FM) swapping, wherein a FM is a large base AI model that is trained on vast amount of data at scale and thus requires a large amount of GPU memory to load and execute (i.e. perform inferencing). The current swapping methods typically work with regular AI model swapping which can be considered small in size and require less memory for storage and execution compared to FMs.

Therefore, there is a need for a method and apparatus for providing AI model swapping that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for providing artificial intelligence (AI) model swapping to support foundation models.

In accordance with embodiments, there is provided a method for model selection for swapping between a first memory and a second memory. The method includes sorting models in a first list, the first list including models loaded in the first memory, wherein sorting is based at least in part on a least recently used (LRU) of each model. The method further includes removing duplicate models from a second list of models, the second list including models to be loaded into the first memory. The method further includes determining an eviction score of each of the models and selecting a model from the first list having a highest eviction score compared with other models in the first list. The method additionally includes swapping the selected model from the first memory to the second memory.

In some embodiments, selecting a model from the first list includes selecting a model from the first list with a first LRU and comparing an eviction score associated with the selected model with evictions scores of other models in the first list.

In some embodiments, upon determination that the eviction score associated with the selected model is highest, the method further includes swapping the selected model from the first memory to the second memory.

In some embodiments, upon determination that the eviction score associated with the selected model is lower, the method further includes selecting a second model from the first list with a subsequent LRU and comparing an eviction score associated with the selected second model with eviction scores of other models in the first list.

In some embodiments, upon determination that the eviction score associated with the selected second model is highest, swapping the selected second model from the first memory to the second memory.

In some embodiments, the eviction score for a particular model is based at least in part on: a size of the particular model, a last time the particular model was used in the first list and a position of the particular model in the second list. an equal weighting factor is applied to each of the size of the particular model, the last time the particular model was used in the first list and the position of the particular model in the second list.

In some embodiments, the first memory is a processor memory and the second memory is a host memory. In some embodiments, the first memory is a host memory and the second memory is a disk memory.

In some embodiments, one or more of the models is a foundation model.

In accordance with embodiments, there is provided an apparatus for model selection for swapping between a first memory and a second memory. The apparatus includes a processor and a memory storing thereon machine executable instructions. The instructions when executed by the processor configure the apparatus to perform one or more of the methods discussed above or elsewhere herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
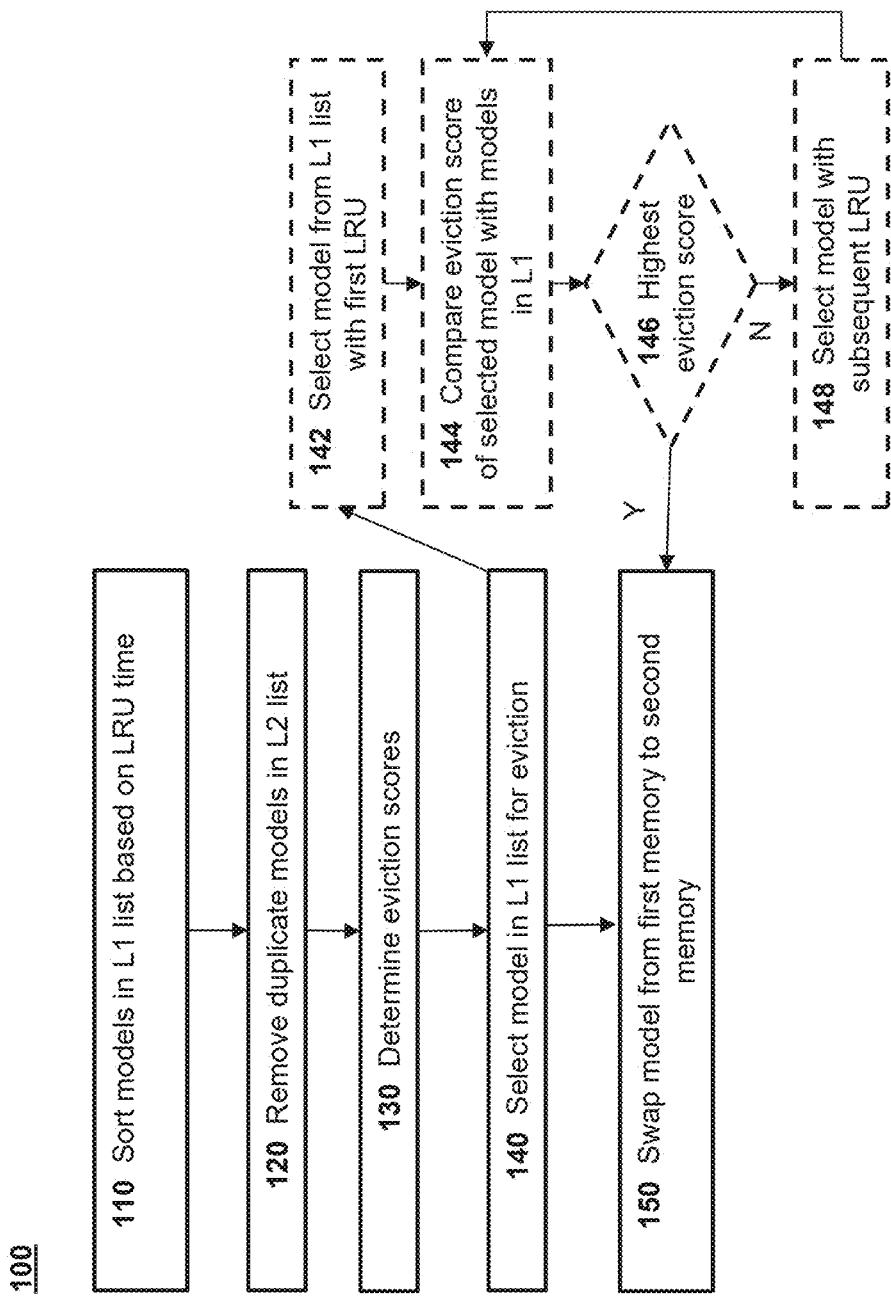
FIG. 1 illustrates a method for providing model swapping in memory, according to embodiments.

Artificial intelligence (AI) workflow applications with multiple large AI model inference (for example foundation model (FM)) are becoming necessary and can be more typical in future. An AI workflow is a combination of multiple individual steps (or tasks) for execution and these individual steps can result in multiple inference calls to different FMs within each step. As is known, a FM is a large base AI model that is trained on vast amount of data at scale and they require a large amount of GPU memory to load and execute (i.e. perform inferencing). For example, when compared to typical deep neural network (DNN) type of AI models (such as ResNet), the memory required for a FM (such as BLOOM, GPT-3) is significantly greater.

It would be understood that plural FMs may not be needed all the time. Requests are dynamic and thus AI model use can be dynamic. As such at a given time, not all of the FMs need to be loaded to the GPU as some AI models will be used less frequently than other FMs. Hosting unused FMs all the time can be considered a waste in terms of both cost as well as memory consumption.

It has been realised that with multiple variants of FMs, for a typical deployment of GPU nodes, the total available GPU memory cannot fit all the FMs at once. As such, FM swapping is required. It has been realized that existing work on AI model swapping suffers from various technical problems in the presence of FMs. Current swapping methods can be considered to primarily work at regular AI model swapping which can be considered small in size and require less memory for storage and execution when compared to FMs. The main characteristic of FMs is their size, when compared to other AI models. As such a FM requires lot of time to load, large memory storage as well as a significant amount of memory for execution.

It has been further realised that current swapping method only considers swapping between the GPU memory and host memory level which can be based on an assumption that the host memory can fit all the AI models needed. However, with FMs, using a further memory layer, namely disk memory, can have the advantage of swapping AI models from host memory when the host memory reaches an associated memory threshold. Furthermore, swapping AI models that are in-frequently used to disk memory can free up host memory.

Yet further it has been realised that simple LRU AI model switching does not consider a future AI model loading pool (from a single and/or multiple workflow requests) with AI model swapping.

According to embodiments there is provided methods and apparatus to provide AI model swapping to support foundation models. The method and apparatus enable the swapping of AI models between three memory layers, namely processor memory (e.g. GPU memory or CPU memory), host memory and disk memory. As such, swapping models between the processor memory and the host memory can be provided, together with the consideration of swapping of models between the host memory and disk memory, thereby freeing some of the host memory for further model swapping with the processor memory. According to some embodiments, the swapping between the three memory layers can be enable using a LRU approach or other approach as would be readily understood by a worker skilled in the art. It is to be readily understood that processor memory as defined herein can be a generalization of a collection of processor memory associated with a plurality of operatively connected computing devices and is not to be considered to be limited to a singular machine. It will be that one or more communicatively connected computing devices can be envisioned for both host memory and disk memory as would be readily understood.

It will be readily understood that this swapping method may be at least equally suitable for the swapping from CPU memory to host memory. As such, the use of GPU memory is used for convenience and it will be readily understood that the GPU memory could equally be GPU memory, CPU memory or a combination of CPU memory and GPU memory. As such, it may be readily understood that the CPU or GPU can be more generically defined as processor memory.

According to embodiments, there is further provided a method and apparatus for an improved swapping strategy when compared to a simple LRU strategy. According to embodiments, a future AI model loading pool (based on a single and/or multiple workflow requests) is considered when selecting of AI models for AI model swapping between memories. This method of AI model swapping can be applied to AI model swapping between two memories, for GPU memory and host memory or between host memory and disk memory. It is to be understood that when having multiple FMs and other small AI models in a workflow, consideration of the size of an AI model and the future usage AI model is desired in order to attempt to avoid an impact on the response time and service level objectives (SLO) associated with the workflow.

According to embodiments, the method applies a combination of a past AI models list and a future AI models list in order to attempt to identify the best possible candidate (i.e. AI model) to swap between GPU memory and host memory or between host memory and disk memory. With this approach there can be an improvement on the overall AI model loading time when compared to using a simple LRU strategy.

According to embodiments, the method of AI model selection for swapping employs a weighted score for the AI models in question in order to perform the selection of the AI model for swapping. This score can include information indicative of AI model size in order to attempt to mitigate FMs being swapped frequently due to the associated cost (e.g. time to load, memory requirements) for FM swapping between memories.

According to embodiments, there is provided a swapping algorithm which improves the overall swapping performance associated with AI model swapping between memories. For FM swapping, it is desired to decrease the latency for loading one or more AI models from an AI model loading pool. Instead of merely adopting a simple LRU policy, additional knowledge regarding the AI models and use of the AI models can be taking into consideration. According to embodiments, knowledge regarding further AI model load requests, past AI model load requests and AI model weight (e.g. AI model size) can be considered when performing selection of an AI model of swapping between memories. In some embodiments, current AI model deployment is also considered when evaluating an AI model for swapping between memories.

According to embodiments, future AI model load requests can be indicative of future AI model requests which will aid with the formulation of an AI model loading list. The AI model loading list can be provided by a scheduler associated with a particular workflow which includes the use of a plurality of AI models for execution.

According to embodiments, past loaded AI models can be indicative of AI models that are already loaded within a particular memory, for example in GPU memory. According to embodiments, a sliding window is used which contains a fixed number of requested AI models and loaded AI models within this sliding window. As a request for a new AI model is received, this sliding window will move in order to account for this new AI model request. It would be understood that a sliding window may also be termed a rolling window, wherein the window moves or rolls in order to account for a new AI model request.

According to embodiments, AI model weight can be assigned to each model, wherein the model weight can be indicative of the size of the AI model. For example, a FM will have higher weight when compared to smaller AI models, as FMs require more time to load or transfer from one memory to another, for example from host memory to GPU memory.

According to some embodiments, a current model deployment plan can also be considered when evaluating an AI model for swapping between memories. Current model deployment can be indicative of current GPU/host resource usage such as loaded AI models and available free memory associated with these memory locations. In addition, during the evaluation of swapping between host memory and disk memory, a current model deployment can be indicative of current host memory/disk memory resource usage.

According to embodiments, there is provided a method for the determination of an AI model eviction score, wherein the determination is defined in Equation (1). It is to be understood that L1 is the memory assigned to loaded models and L2 is the memory assigned to models that are to be loaded.

$$\text{score} = \frac{100}{\text{last\_used\_time\_in\_L1}} + \frac{100}{\text{model\_size}} + \frac{100}{\text{sliding\_window\_length} - \text{index\_position\_in\_L2}} \quad (1)$$

wherein: last_used_time_in_L1: is the time when the AI model was last used in L1;
model_size: is the size of the model; and
index_position_in_L2: is the index position of the item in the future usage list.

According to embodiments, the evaluation of the eviction score can be determined as follows: If an AI model has not been used recently (e.g. based on last_used_time_in_L1), the AI model gets a high score. If an AI model has a small size, the AI model gets a high score. If an AI model is far away in L2 based on the index position of the AI model, the AI model gets a high score. As defined in Equation 1, it assigns a weight of 100 to each parameter. The eviction score is calculated by adding up the weighted values of each parameter, wherein the higher the eviction score, the more likely the AI model is selected for swapping.

It will be readily understood that the weight associated with the parameters can be another value, however in the scenario as defined by Equation 1, the weight for the three parameters used for the calculation of the eviction score are the same. It is to be further understood that the weight associated with the parameters can be different, and the determination of the associated weights can be defined by an assigned priority to each of the parameters.

According to embodiments, the weight (or weights) associated with each of the parameters can be further determined based on the memories with which the eviction score is associated. For example, a first set of weights may be associated with the parameters of the eviction score when associated with the swapping of models between processor memory and host memory. A second set of weights may be associated with the parameters of the eviction score when associated with the swapping of models between host memory and disk memory.

According to embodiments, there is provided a method for AI model swapping between two memory locations. It is to be readily understood that a memory location can be associated with a single computing device or provided by a plurality of communicatively connected computing device. The memory includes the assignment of the AI models to be considered into two different memory designations. These designations can be defined as an L1 list which identifies AI models that are loaded in the particular memory and an L2 list which identifies AI models that are to be loaded into the particular memory. The combination of the L1 list of AI models and the L2 list of AI models defines the fixed number of AI models assigned to the sliding window, which may also be called a rolling window. It is to be understood that this method for AI model swapping can be performed with respect to AI model swapping between a GPU memory and a host memory. It is to be further understood that this method for AI model swapping can be performed between host memory and disk memory.

According to embodiments, the method includes sorting the AI models associated with the L1 list based on their least recently used (LRU) time. The method further includes removing from the L2 list AI models that are already present in the L1 list. As the L2 list defines the sequence of AI model requests, the L2 list is already first in first out (FIFO) ordered based on AI model request. As previously noted, the combination of the L1 list of AI models and the L2 list AI models forms a sliding window, having a total number of identified AI models associated therewith. Upon the swapping of an AI model, it is understood that the selected AI model is evicted from memory, and as such removed the L1 list, another AI model would move from the L2 list to the L1 list, opening up one space in the L2 list for a subsequent AI model request. As such, L2 will be continuously updated based on incoming AI model requests. The method further includes assigning an eviction score for all of the AI models in both the L1 list and the L2 list based on three criteria, namely the model_size, last_used_time_in_L1 and index_position_in_L2, wherein the eviction score can be expressed as defined above with respect to Equation 1.

According to embodiments, the method further includes comparing the eviction score of each AI model in the L1 list against the eviction score of each AI model in the L2 list and selecting an AI model in the L1 list for swapping from the L1 list.

According to embodiments, the comparison includes iterating from first LRU item in the L1 list and comparing the eviction score of the AI model selected for swapping from the L1 list against the eviction score of the other AI model in the L1 list. If the AI model selected for swapping from the L1 list has the highest eviction score, that particular AI model is assigned for eviction and selection loop terminates. However, if the selected AI model does not have the highest eviction score, the method includes iterating from to the subsequent LRU AI model in L1 and performing the eviction score comparison with the other AI models in the L1 list.

According to embodiments, once a particular AI model is selected from swapping, the selected AI model is moved from the first memory to the second memory. For example, the moving of the selected AI model from the GPU memory to the host memory or moving the selected AI model from the host memory to disk memory.

According to embodiments, the above method is performed to select an AI model for eviction from the host memory. However, this method may only be performed if the host memory has reached a memory threshold, namely the collection of AI models being accessed have a collective memory requirement greater than the memory threshold of the host memory. If eviction of an AI model from the host memory is required, upon selection of that particular AI model, the AI model can be evicted from host memory and saved on disc memory.

FIG. 1 illustrates a method 100 for providing model swapping in memory, according to embodiments. At first instance, the first memory and a certain set of models loaded therein, wherein these models are allocated to the L1 list. There is further defined a L2 list of models wherein the L2 list of models identifies the models to be used in the workflow. It is to be understood that the workflow includes a plurality of steps, wherein each step may include the execution of a particular model. The L2 list of models is identified in a FIFO manner based on receipt of model requests associated with the workflow.

As illustrated in FIG. 1 the method 100 includes sorting 110 the models in the L1 list of models base on their respective least recently used (LRU) time. Subsequently, the method includes removing 120 duplicate models that are present in the L2 list of models. The method includes determining 130 the eviction score for the models present in the L1 list of models and the L2 list of models. Based on the eviction scores, a model present in the L1 list of models is selected 140 for eviction. The method additionally includes swapping 150 the selected model from the L1 list of models, from the first memory to the second memory.

According to some embodiments, the selection 140 of a model for eviction, wherein the model is present in the L1 list of models, can include several steps that are further defined below. The step of selecting 140 a model for eviction can include selecting 142 a potential model from the L1 list of models for eviction. The potential model selected has a first LRU. Subsequently, the eviction score associated with the potential model is compared 144 with the eviction score of each of the other models that are present in the L1 list of models. If the eviction score associated with the potential model is the highest eviction score, that is the model that is selected for eviction and model swapping 150 from the first memory to the second memory proceeds.

However, in the instance that the eviction score of the potential model is not the highest, then a new potential model is selected 148 for eviction. The new potential model selected has a subsequent LRU, when compared to the first LRU. The eviction score associated with the new potential model is compared 144 with the eviction score of each of the other models that are present in the L1 list of models. If the eviction score associated with the new potential model is the highest eviction score, that is the model that is selected for eviction and model swapping 150 from the first memory to the second memory proceeds. However, in the instance that the eviction score of the new potential model is not the highest, then a second new potential model is selected 144 for eviction, and the process is repeated again. It is to be understood that steps 142 to 148 can be considered to define a procedure which will select a model for eviction which has the highest eviction score.

According to embodiments, upon the eviction of the selected model from the first memory, there is space in the first memory for the loading of a model from the second memory that is required to be present in the first memory.

Figure 2:
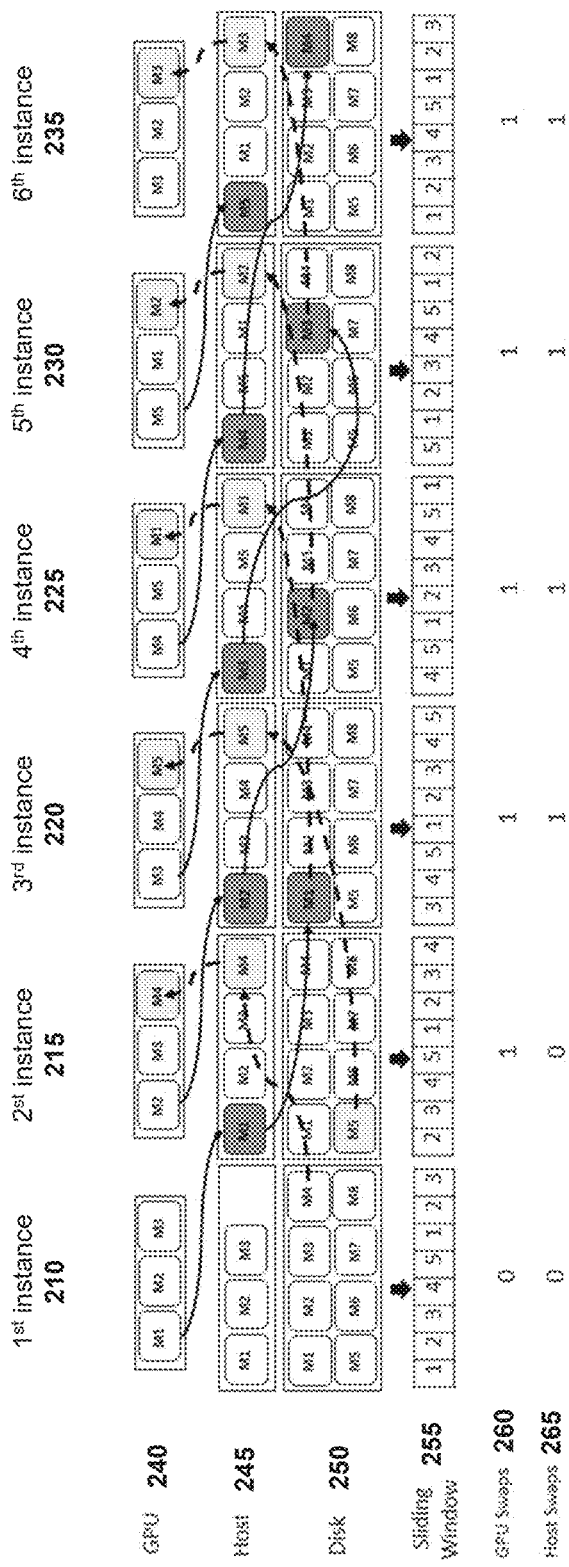
FIG. 2 illustrates an example of model swapping in memory, wherein there are three memory layers considered for model swapping, according to embodiments.

FIG. 2 illustrates an example of model swapping in memory, wherein there are three memory layers considered for model swapping, according to embodiments. In this example, there are a total of 5 models that are associated with the particular workflow, the processor memory (e.g. GPU memory) 240 can store only 3 models at any particular time, and the host memory 245 can store a total of 4 models at any particular time. As illustrated, the disk memory 250 stores all of the models including some models that are not associated with the particular workflow. In addition, for this example, the sliding window 255 includes the listing of the models in order to use associated with the particular workflow. The example illustrates model swaps between the three memory levels, processor memory 240, host memory 245 and disk memory 250 as would be required based solely on the next model that is required and indicated by the arrow in the sliding window 255.

Referring to FIG. 2, illustrated is a total of 6 memory instances, wherein models can change memory locations in order to facilitate the performance of the workflow. In addition, the sliding window 255 is ordered indicating the models in the processor memory wherein the three models on the left side of the sliding window are ordered such that the most recently used model is in the third position (i.e. third position from the left side). In the example illustrated in FIG. 2, the evaluation and determination of the model for eviction from a particular memory, which may also be defined as model swapping, is based solely on the model determined to be least recently used (LRU).

In the first instance 210, the processor memory 240 and the host memory 245 contain the same models. Based on the sliding window 255 it is known that model 4 (M4) is the next required model that is to be loaded into processor memory 240. As M4 is not present in host memory 245, it is selected for moving from disk memory 250 to host memory 245. Model 1 (M1) is the model that is the LRU model in the processor memory 210 and as such is selected to be moved from processor memory 210 to host memory 245 in order for M4 to be subsequently loaded into processor memory 240.

In the second instance 215, based on the sliding window 255 it is known that M5 is the next required model that is to be loaded into processor memory 240. As M5 is not present in host memory 245, it is selected for moving from disk memory 250 to host memory 245. M2 is the model that is the LRU model in processor memory 210 and as such is selected to be moved from processor memory 210 to host memory 245 in order for M5 to be subsequently loaded into processor memory 240 in the next memory instance. As M1 is the LRU model in the host memory 245, this model is selected for moving from host memory 245 to disk memory 250 in order to provide space for M5 to be loaded into host memory 250.

In the third instance 220, based on the sliding window 255 it is known that M1 is the next required model that is to be loaded into processor memory 240. As M1 is not present in host memory 245, it is selected for moving from disk memory 250 to host memory 245 in order for M1 to be subsequently loaded into processor memory 240 in the next memory instance. M3 is the model that is the LRU model in processor memory 210 and as such is selected to be moved from processor memory 210 to host memory 245. As M2 is the LRU model in the host memory 245, this model is selected for moving from host memory 245 to disk memory 250 in order to provide space for M1 to be loaded into host memory 250.

In the fourth instance 225, based on the sliding window 255 it is known that M2 is the next required model that is to be loaded into processor memory 240. As M2 is not present in host memory 245, it is selected for moving from disk memory 250 to host memory 245 in order for M2 to be subsequently loaded into processor memory 240 in the next memory instance. M4 is the model that is the LRU model in processor memory 210 and as such is selected to be moved from processor memory 210 to host memory 245. As M3 is the LRU model in the host memory 245, this model is selected for moving from host memory 245 to disk memory 250 in order to provide space for M2 to be loaded into host memory 250.

In the fifth instance 230, based on the sliding window 255 it is known that M3 is the next required model that is to be loaded into processor memory 240. As M3 is not present in host memory 245, it is selected for moving from disk memory 250 to host memory 245 in order for M3 to be subsequently loaded into processor memory 240 in the next memory instance. M5 is the model that is the LRU model in processor memory 210 and as such is selected to be moved from processor memory 210 to host memory 245. As M4 is the LRU model in the host memory 245, this model is selected for moving from host memory 245 to disk memory 250 in order to provide space for M3 to be loaded into host memory 250.

In the sixth instance 235, based on the sliding window 255 it is known that M4 is the next required model that is to be loaded into processor memory 240. As M4 is not present in host memory 245, it would be selected for moving from disk memory 250 to host memory 245. M1 is the model that is the LRU model in processor memory 210 and as such would be selected to be moved from processor memory 210 to host memory 245. As M5 is the LRU model in the host memory 245, this model would be selected for moving from host memory 245 to disk memory 250 in order to provide space for M4 to be loaded into host memory 250.

According to embodiments, the swapping of models between three memory layers is provided wherein a LRU based strategy it used to swap models between the processor memory and host memory and also between the host memory and the disk memory. The number of processor memory swaps 260 (GPU swaps) is defined for each memory instance, wherein there are a total of 5 processor memory swaps. The number of host memory swaps 265 is defined for each memory instance, wherein there are a total of 4 host memory swaps.

Figure 3:
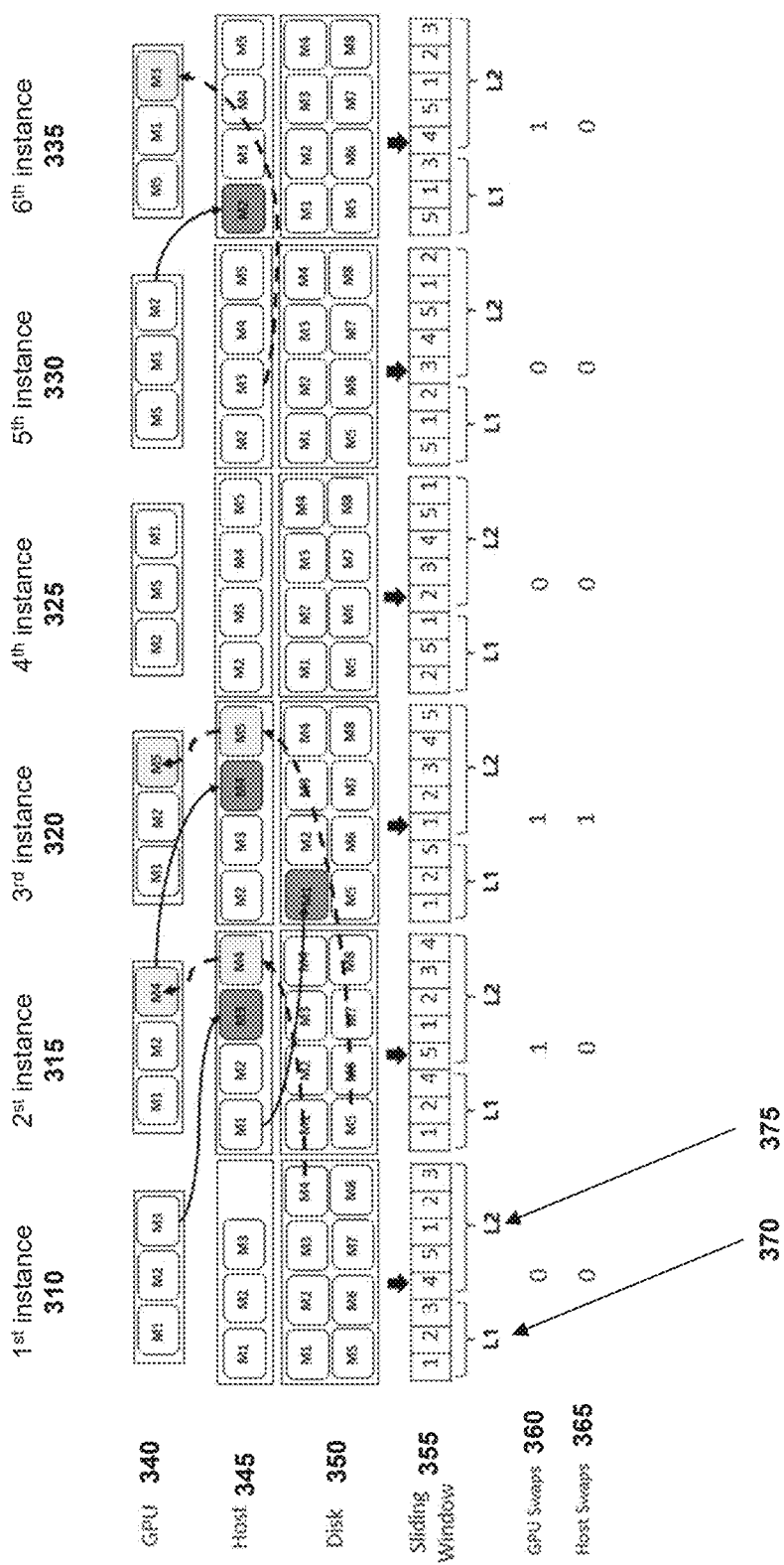
FIG. 3 illustrates an example of model swapping in memory, wherein there are three memory layers considered for model swapping and model selection based on eviction score, according to embodiments.

FIG. 3 illustrates an example of model swapping in memory, wherein there are three memory layers considered for model swapping and model selection based on eviction score, according to embodiments. In this example, there are a total of 5 models that are associated with the particular workflow, the processor memory (e.g. GPU memory) 340 can store only 3 models at any particular time, and the host memory 345 can store a total of 4 models at any particular time. As illustrated, the disk memory 350 stores all of the models including some models that are not associated with the particular workflow. In addition, for this example, the sliding window 355 includes the listing of the models, wherein the sliding window 355 is separated into two lists, namely L1 list 370, which defines models currently in processor memory 340 and L2 list 375. The L2 list 375 further defines models that are to be loaded into processor memory 340 and further defined in order of being required, wherein the next model that is required is indicated by the arrow in the sliding window 355. In addition, for this example it is considered that all of the models are the same size and as such, when determining the eviction score associated with the models, it may be considered to be dependent on last_used_time_in_L1 and index_position_in_L2 as the change in the eviction score based on model_size would be equivalent for each model.

In the first instance 310, the processor memory 340 and the host memory 345 contain the same models. Based on the sliding window 355 it is known that M4 is the next required model that is to be loaded into processor memory 340. As M4 is not present in host memory 345, it is selected for moving from disk memory 350 to host memory 345. The L1 list of models is ordered with respect to LRU, wherein the LRU model is at the left side of the sliding window associated with the L1 list. Secondly, duplicate models are removed from the L2 list, however in this instance there are no duplicate models in the L2 list. The eviction score is determined for each of the models and the eviction scores for the models in the L1 list are compared. While M3 is the most recently used model, as it is the model that is the currently fifth required future model, the eviction score for M3 will be higher than the eviction scores of M1 and M2. As such, M3 is selected for moving from processor memory 340 to host memory 345 to provide space within the processor memory 340 for subsequent loading of M4 in the next memory instance.

In the second instance 315, based on the sliding window 355 it is known that M5 is the next required model that is to be loaded into processor memory 340. As M5 is not present in host memory 345, it is selected for moving from disk memory 350 to host memory 345. The L1 list of models is ordered with respect to LRU, wherein the LRU model is at the left side of the sliding window associated with the L1 list. Secondly, duplicate models are removed from the L2 list, however in this instance there are no duplicate models in the L2 list. The eviction score is determined for each of the models and the eviction scores for the models in the L1 list are compared. While M4 is the most recently used model, as it is the model that is the currently fifth required future model, the eviction score for M4 will be higher than the eviction scores of M1 and M2. As such, M4 is selected for moving from processor memory 340 to host memory 345 to provide space within the processor memory 340 for subsequent loading of M5 in the next memory instance. In addition, in the second instance 310 as a model has been selected to be moved from disk memory 350 to host memory 345, a model in host memory is to be selected for eviction in order to provide space for the loading of a new model into the host memory 345. A similar selection process is performed with respect to the host memory, wherein eviction scores are determined and in this example it is determined that M1 is to be evicted from host memory 345.

In the third instance 320, based on the sliding window 355 it is known that M1 is the next required model. As M1 is present in the processor memory 340, a model does not have to be selected for eviction.

In the fourth instance 325, based on the sliding window 355 it is known that M2 is the next required model. As M2 is present in the processor memory 340, a model does not have to be selected for eviction.

In the fifth instance 330, based on the sliding window 355 it is known that M3 is the next required model that is to be loaded into processor memory 340. The L1 list of models is ordered with respect to LRU, wherein the LRU model is at the left side of the sliding window associated with the L1 list. Secondly, duplicate models are removed from the L2 list, however in this instance there are no duplicate models in the L2 list. The eviction score is determined for each of the models and the eviction scores for the models in the L1 list are compared. While M2 is the most recently used model, as it is the model that is the currently fifth required future model, the eviction score for M2 will be higher than the eviction scores of M5 and M1. As such, M2 is selected for moving from processor memory 340 to host memory 345 to provide space within the processor memory 340 for subsequent loading of M3 in the sixth instance 335.

According to embodiments, the selection of the models for swapping between the three memory layers determined based at least in part on an eviction score that is determined based on Equation 1. For this example, while the sequence of the workflow is the same as that of the previous example, the number of processor memory swaps 360 (GPU swaps) is defined for each memory instance, wherein there are a total of 3 processor memory swaps. The number of host memory swaps 365 is also defined for each memory instance, wherein there are a total of 1 host memory swaps.

Having regard to these two examples provided above, the inclusion of an eviction score for model swapping selection, can reduce the number of required model swaps which can result in a reduction of processor usage for model swapping thereby freeing the processor to perform other tasks. It can also provided for accelerated processing of a workflow in light of the reduction of processing power being used for model transfer between memories. According to embodiments, by accounting for both past loaded models (defined by the L1 list) and future models to be loaded (defined by the L2 list) can improve processing speed associated with a particular workflow.

Figure 4:
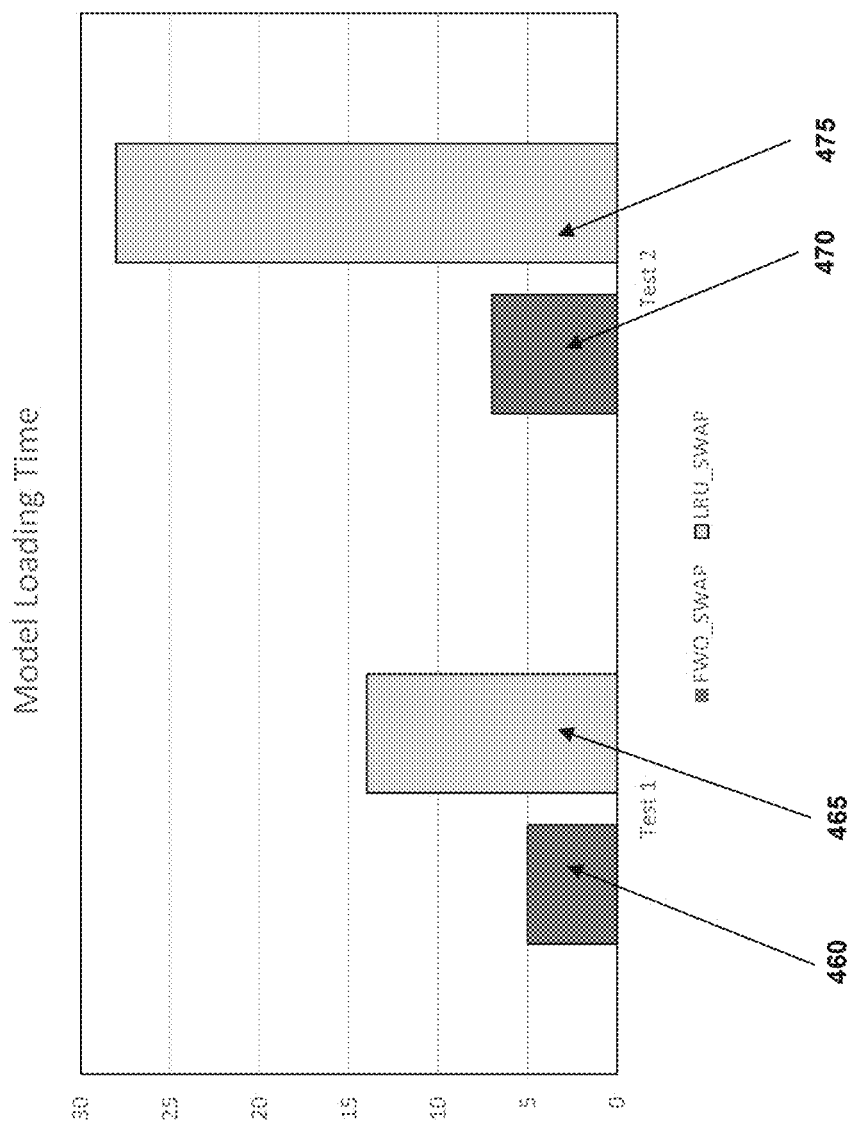
FIG. 4 illustrates two test comparisons of model loading time for model swapping methods, including a method according to embodiments.

FIG. 4 illustrates two test comparisons of model loading time for model swapping methods, including a method according to embodiments. Illustrated is two different simulated test cases, wherein both of these simulations are comparing two model swapping methods, wherein the total model loading time is a comparison factor. The first model swapping method is solely considering least recently used (LRU) model swapping identification and illustrated as bars 465 and 475 for Test 1 and Test 2 respectively. The second model swapping method includes consideration of both past loaded models (defined by the L1 list) and future models to be loaded (defined by the L2 list) wherein model swapping identification is performed at least in part based on an eviction score and illustrated as bars 460 and 470 for Test 1 and Test 2 respectively.

Test 1 includes a model pool size of 20 models and Test 2 includes a model pool size of 40 models. The assumptions for both of these simulations are that there are five different models associated with the workflow, wherein each of these models have the same size. In addition, it is assumed that model transfer time from host memory to processor memory is six times faster than model transfer time from disk memory to host memory.

As illustrated in FIG. 4, the overall swapping time is decreased when using a model swapping method includes consideration of both past loaded models (defined by the L1 list) and future models to be loaded (defined by the L2 list) wherein model swapping identification is performed at least in part based on an eviction score. It is to be understood that an end goal when having multiple large models with limited processor resources e.g. (GPU/CPU resources) is to reduce the model swapping time so that inference requests (associated with the AI model) can be served as quickly as possible. When using a simple LRU method, which does not consider the future models to be loaded, that method suffers from high latency. As illustrated in FIG. 4, by applying a swapping method that includes consideration of both past loaded models (defined by the L1 list) and future models to be loaded (defined by the L2 list) wherein model swapping identification is performed at least in part based on an eviction score approach improves on the loading time and models can be served much faster. For example, in Test 1 there is a 64.3% reduction in model loading time and in Test 2 there is a 75% reduction model loading time when a method according to embodiments is compared with a simple LRU method.

According to embodiments, the overall swapping time of AI models can be decreased using a method a described herein. The end goal when having multiple large models with limited GPU/CPU resources is to reduce the model swapping time so that inference requests can be served quickly. When using a simple LRU strategy, which does not consider the future models to be loaded, the simple LRU strategy suffers from a higher latency. The methods according to the instant application can improve loading time and AI models can be served faster.

According to embodiments, the reduction of both the overall swapping time and the number of swaps can be provided by methods according to the instant application. The method of the instant application can provide an advantage as it can make use of both past and future model which reduces to the overall swapping time of the model list and number of swaps. This can be advantageous when serving models as they are loaded into the GPU memory (or processor memory) quickly as opposed to using a simple LRU strategy. With the reduced number of swaps, the data movement between the GPU memory and the host memory can be reduced.

According to embodiments, method of the instant application can provide efficient memory usage at different levels when using FMs. With large models (FMs), cloud providers desire efficient use the available memory (e.g. GPU memory and host memory) in order to increase resource usage and move unused or infrequently used AI models to lower storage levels.

According to some embodiments, the method and apparatus disclosed herein can be applicable for cloud vendors with serverless cloud offerings, for example targeting AI workflows with foundation models.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

Figure 5:
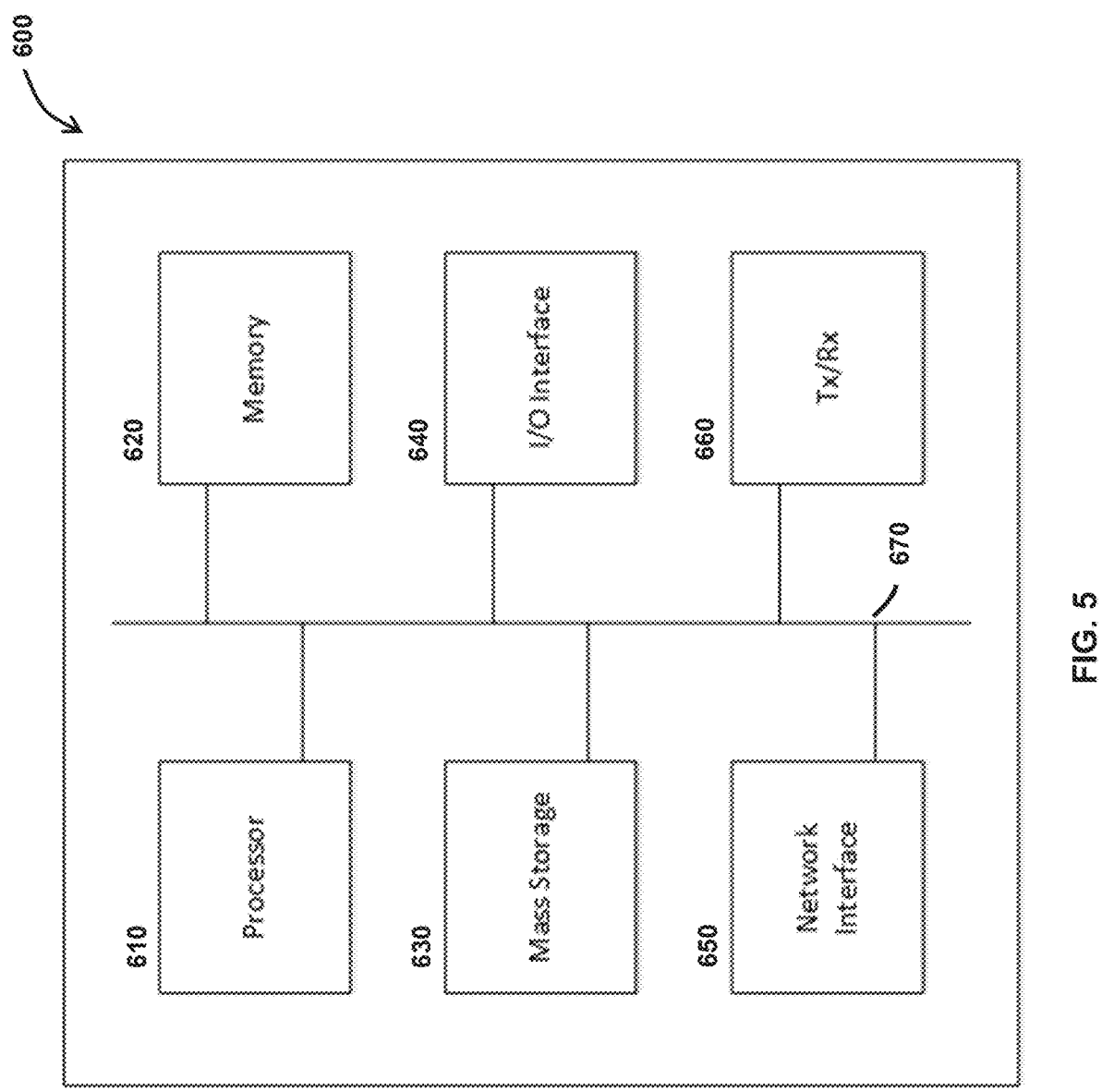
FIG. 5 is a schematic diagram of an electronic device that may perform any or all of operations of the above methods and features explicitly or implicitly described herein, according to different embodiments.

FIG. 5 is a schematic diagram of an electronic device 600 that may perform any or all of operations of the above methods and features explicitly or implicitly described herein, according to different embodiments. For example, a computer equipped with network function may be configured as electronic device 600.

As shown, the device includes a processor 610, such as a central processing unit (CPU) or specialized processors such as a graphics processing unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or computer program product configured to store data and machine executable program code. According to certain embodiments, the memory 620 or mass storage 630 may have recorded thereon statements and instructions executable by the processor 610 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for model selection for swapping between a first memory and a second memory, the method comprising:
   sorting models in a first list, the first list including models loaded in the first memory, wherein sorting is based at least in part on a least recently used (LRU) of each model;
   removing duplicate models, if any, from within a second list of models, the second list including models to be loaded into the first memory;
   determining an eviction score of each of the models based at least in part on: a size of the particular model, a last time the particular model was used in the first list and an index position of the particular model in the second list;
   selecting a model from the first list having a highest eviction score compared with other models in the first list; and
   swapping the selected model from the first memory to the second memory.

2. The method according to claim 1, wherein selecting includes:
   selecting one of the models from the first list with a first LRU;
   comparing the eviction score associated with the selected model with evictions scores of other models in the first list;
   upon determination that the eviction score associated with the selected model is highest, swapping the selected model from the first memory to the second memory.

3. The method according to claim 2, wherein selecting includes:
   upon determination that the eviction score associated with the selected model is lower, selecting a second model from the first list with a subsequent LRU;
   comparing an eviction score associated with the selected second model with eviction scores of other models in the first list;
   upon determination that the eviction score associated with the selected second model is highest, swapping the selected second model from the first memory to the second memory.

4. The method according to claim 1, wherein an equal weighting factor is applied to each of the size of the particular model, the last time the particular model was used in the first list and the index position of the particular model in the second list.

5. The method according to claim 4, wherein the eviction score for a particular model is defined by:

$$\text{score} = \frac{100}{\text{last\_used\_time\_in\_L1}} + \frac{100}{\text{model\_size}} + \frac{100}{\text{sliding\_window\_length} - \text{index\_position\_in\_L2}}$$

wherein: last_used_time_in_L1 is the time when the particular model was last used in the first list;
model_size is the size of the particular model;
sliding_window_length is the length of the second list; and
index_position_in_L2 is the index position of the particular model in the second list.

6. The method according to claim 1, wherein the first memory is a processor memory and the second memory is a host memory.

7. The method according to claim 1, wherein the first memory is a host memory and the second memory is a disk memory.

8. The method according to claim 1, wherein one or more of the models is a foundation model.

9. An apparatus for model selection for swapping between a first memory and a second memory, the apparatus comprising:
   a processor; and
   a memory storing thereon machine executable instructions, the instructions when executed by the processor configure the apparatus to:
      sort models in a first list, the first list including models loaded in the first memory, wherein sorting is based at least in part on a least recently used (LRU) of each model;
      remove duplicate models, if any, from within a second list of models, the second list including models to be loaded into the first memory;
      determine an eviction score of each of the models based at least in part on: a size of the particular model, a last time the particular model was used in the first list and an index position of the particular model in the second list;
      select a model from the first list having a highest eviction score compared with other models in the first list; and
      swap the selected model from the first memory to the second memory.

10. The apparatus according to claim 9, wherein when selecting, the instructions when executed by the processor configure the apparatus to:
    select one of the models from the first list with a first LRU;
    compare the eviction score associated with the selected model with eviction scores of other models in the first list;
    upon determination that the eviction score associated with the selected model is highest, swap the selected model from the first memory to the second memory.

11. The apparatus according to claim 10, wherein when selecting, the instructions when executed by the processor configure the apparatus to:
    upon determination that the eviction score associated with the selected model is lower, select a second model from the first list with a subsequent LRU;
    compare an eviction score associated with the selected second model with evictions scores of other models in the first list;
    upon determination that the eviction score associated with the selected second model is highest, swap the selected second model from the first memory to the second memory.

12. The apparatus according to claim 9, wherein an equal weighting factor is applied to each of the size of the particular model, the last time the particular model was used in the first list and the index position of the particular model in the second list.

13. The apparatus according to claim 12, wherein the eviction score for a particular model is defined by:

$$\text{score} = \frac{100}{\text{last\_used\_time\_in\_L1}} + \frac{100}{\text{model\_size}} +$$

-continued $$\frac{100}{sliding\_window\_length - index\_position\_in\_L2}$$

wherein: last_used_time_in_L1 is the time when the particular model was last used in the first list;
model_size is the size of the particular model;
sliding window length is the length of the second list; and
index_position_in_L2 is the index position of the particular model in the second list.

14. The apparatus according to claim 9, wherein the first memory is a processor memory and the second memory is a host memory.

15. The apparatus according to claim 9, wherein the first memory is a host memory and the second memory is a disk memory.

16. The apparatus according to claim 9, wherein one or more of the models is a foundation model.

* * * * *